(12) United States Patent
Loewe

(10) Patent No.: US 9,097,353 B2
(45) Date of Patent: Aug. 4, 2015

(54) VENTILATION DEVICE

(75) Inventor: Hubert Loewe, Weselberg (DE)

(73) Assignee: TRW AUTOMOTIVE ELECTRONICS & COMPONENTS GMBH, Radolfzell (DE)

( * ) Notice: Subject to any disclaimer, the term of this patent is extended or adjusted under 35 U.S.C. 154(b) by 1767 days.

(21) Appl. No.: 12/287,128

(22) Filed: Oct. 6, 2008

(65) Prior Publication Data

US 2009/0104866 A1 Apr. 23, 2009

(30) Foreign Application Priority Data

Oct. 19, 2007 (DE) .................. 20 2007 014 663 U

(51) Int. Cl.
B60H 1/24 (2006.01)
F16K 15/03 (2006.01)

(52) U.S. Cl.
CPC .............. *F16K 15/031* (2013.01); *B60H 1/249* (2013.01); *B60H 1/246* (2013.01)

(58) Field of Classification Search
CPC ....... B60H 1/249; B60H 1/246; F16K 15/031
USPC ...................................... 454/162; 137/512.15
See application file for complete search history.

(56) References Cited

U.S. PATENT DOCUMENTS

| 5,105,731 | A | | 4/1992 | Kraus |
| 5,105,849 | A | | 4/1992 | Clough |
| 5,263,895 | A | * | 11/1993 | Kraus et al. ................ 454/162 |
| 5,355,910 | A | * | 10/1994 | Gies et al. .................. 137/858 |
| 5,373,867 | A | * | 12/1994 | Boyesen et al. ............. 137/514 |
| 5,601,117 | A | * | 2/1997 | Lewis et al. ................. 137/855 |
| 5,727,999 | A | * | 3/1998 | Lewis .......................... 454/162 |
| 6,026,852 | A | * | 2/2000 | Barton et al. ............ 137/512.15 |
| 6,132,308 | A | * | 10/2000 | Dietz et al. .................. 454/162 |
| 6,210,266 | B1 | * | 4/2001 | Barton .......................... 454/162 |
| 6,273,127 | B1 | * | 8/2001 | Wade ...................... 137/512.15 |
| 6,458,027 | B1 | | 10/2002 | Stiehl |
| 6,648,749 | B2 | * | 11/2003 | Hayashi et al. .............. 454/162 |
| 6,837,784 | B2 | * | 1/2005 | Omiya et al. ................ 454/162 |
| 7,077,742 | B2 | * | 7/2006 | Stevenson et al. ........... 454/259 |
| 7,302,962 | B2 | * | 12/2007 | Blake et al. ............... 137/15.18 |
| 7,517,280 | B2 | * | 4/2009 | McConnell et al. .......... 454/162 |
| 8,485,872 | B2 | * | 7/2013 | Valencia, Jr. ................ 454/162 |
| 2003/0017799 | A1 | | 1/2003 | Hayashi et al. |
| 2004/0127154 | A1 | * | 7/2004 | Omiya et al. ................ 454/162 |

(Continued)

FOREIGN PATENT DOCUMENTS

DE 4002052 7/1991
DE 19926997 12/1999

(Continued)

*Primary Examiner* — Steven B McAllister
*Assistant Examiner* — Frances F Hamilton
(74) *Attorney, Agent, or Firm* — Tarolli, Sundheim, Covell & Tummino LLP

(57) ABSTRACT

A ventilation device has a frame (12) made of a first material component, and a non-return flap element (14) made of a second material component, wherein the first material component is harder than the second material component. The non-return flap element (14) includes a movable non-return flap (18), which is arranged such that it exclusively rests against the non-return flap element (14) or the ventilation device (10) is mountable on a vehicle component (28), wherein that part of the ventilation device (10) which engages the vehicle component (28) is part of the non-return flap element (14).

12 Claims, 7 Drawing Sheets

(56) References Cited

U.S. PATENT DOCUMENTS

| | | | |
|---|---|---|---|
| 2007/0175523 A1* | 8/2007 | Levey et al. | 137/512.15 |
| 2008/0076344 A1* | 3/2008 | Flowerday | 454/162 |
| 2009/0280736 A1* | 11/2009 | Schneider | 454/162 |

FOREIGN PATENT DOCUMENTS

| | | |
|---|---|---|
| DE | 19845746 | 4/2000 |
| DE | 10011884 | 12/2000 |
| DE | 10358545 | 4/2005 |
| DE | 102005024527 | 11/2006 |
| EP | 1026021 | 8/2000 |
| JP | 5890815 | 6/1983 |
| JP | 6421013 | 2/1989 |
| JP | 5280649 | 10/1993 |
| JP | 8332836 | 12/1996 |
| JP | 200236861 | 2/2002 |
| JP | 200334128 | 2/2003 |
| KR | 20040025306 | 3/2004 |

* cited by examiner

VENTILATION DEVICE

FIELD OF THE INVENTION

This invention relates to a ventilation device, in particular for venting a passenger compartment.

BACKGROUND OF THE INVENTION

Ventilation devices are known that comprise a frame made of a first material component and a non-return flap element made of a second material component, wherein the first material component is harder than the second material component.

A ventilation device provides for discharging the air supplied to the passenger compartment via a ventilation system. The ventilation device has a frame, which receives at least one non-return flap. When no air flows out of the passenger compartment, the non-return flap rests against the frame, so that an ingress of moisture, exhaust gas or dirt into the passenger compartment is prevented. It is known to manufacture such ventilation devices from two components, wherein the frame is made of a harder material component, whereas the non-return flap is formed of a softer material component. When a higher pressure exists in the passenger compartment than in the surroundings of the vehicle, the non-return flap moves into a position in which the air can flow out of the passenger compartment. As a result, the pressure is decreasing in the passenger compartment, and the non-return flap moves towards the frame, in order to prevent the ingress of moisture, exhaust gas or dirt into the passenger compartment. During closure of the non-return flap, the same strikes against the frame, which is made of a harder material than the non-return flap itself. There is produced noise which is disturbing for a vehicle occupant.

A further disadvantage of known ventilation devices is the fact that the same are not decoupled from the vehicle body, so that vibrations resulting from the movement of the non-return flap can be transmitted to the vehicle body.

It is an object of the invention to provide a ventilation device, which can be manufactured at low cost and is characterized by a good functionality (free of rattling, vibration decoupling, etc.).

BRIEF SUMMARY OF THE INVENTION

This is achieved in a ventilation device comprising a frame made of a first material component, and a non-return flap element made of a second material component, wherein the first material component is harder than the second material component. The ventilation device has at least one of the following features:
 a) The non-return flap element includes a movable non-return flap, which is arranged such that it exclusively rests against the non-return flap element
 b) The ventilation device is mountable on a vehicle component, wherein that part of the ventilation device which engages the vehicle component is part of the non-return flap element.

In accordance with the invention, the non-return flap which is part of the non-return flap element is arranged such that in no position it directly rests against the frame, i.e. in the closed position, in which the non-return flap prevents an ingress of moisture, exhaust gas or dirt into a passenger compartment, it does not rest against the frame. During closure of the non-return flap, the same does not strike against the harder material of the frame, which would cause disturbing noise. The non-return flap rather strikes against the softer material of the non-return flap element. Disturbing noise thereby is prevented. The invention furthermore takes into account that the ventilation device is decoupled from a vehicle component on which it is mounted. In accordance with the invention, the ventilation device engages the vehicle component with a part which is made of the softer material component. Thus, the ventilation device is decoupled from the vehicle component, which in particular is a sheet metal component. Due to the decoupling of the ventilation device from the vehicle component, no vibrations resulting from the movement of the non-return flap are transmitted to the vehicle component.

Preferably, the non-return flap element includes protrusions, which can be engaged by the non-return flap. In the closed condition, the non-return flap rests against the protrusions, which are formed of the softer material component.

In particular, the protrusions are distributed over the width of the non-return flap element. Thus, the non-return flap rests against several points spaced from each other.

Preferably, the non-return flap element includes at least one lip, which serves to mount the non-return flap element on the vehicle component. In particular, a closed circumferential lip and a plurality of spaced, curved lips are provided, wherein the vehicle component can be inserted and clamped between the circumferential lip and the curved lips.

Preferably, the lip serves as sealing lip. Upon insertion of the ventilation device into an opening of the vehicle component, the closed circumferential lip seals between the ventilation device and the vehicle component.

In accordance with one embodiment, the non-return flap includes reinforcement ribs, which extend in longitudinal direction up to at least one edge of the non-return flap. The reinforcement ribs reinforce the non-return flap and prevent fluttering of the same. Fluttering of the non-return flap might cause disturbing noise.

In accordance with a further embodiment, the non-return flap includes reinforcement ribs, which, as seen in longitudinal direction, end at a distance from an edge. The reinforcement ribs, which serve to reinforce the non-return flap and thus prevent fluttering thereof, do not extend up to the edge of the non-return flap. The region of the non-return flap element, against which the non-return flap rests in the closed condition, therefore is formed flat (i.e. without elevations and depressions).

Further features and advantages can be taken from the sub-claims.

DETAILED DESCRIPTION OF PREFERRED EMBODIMENTS

Figure 1:
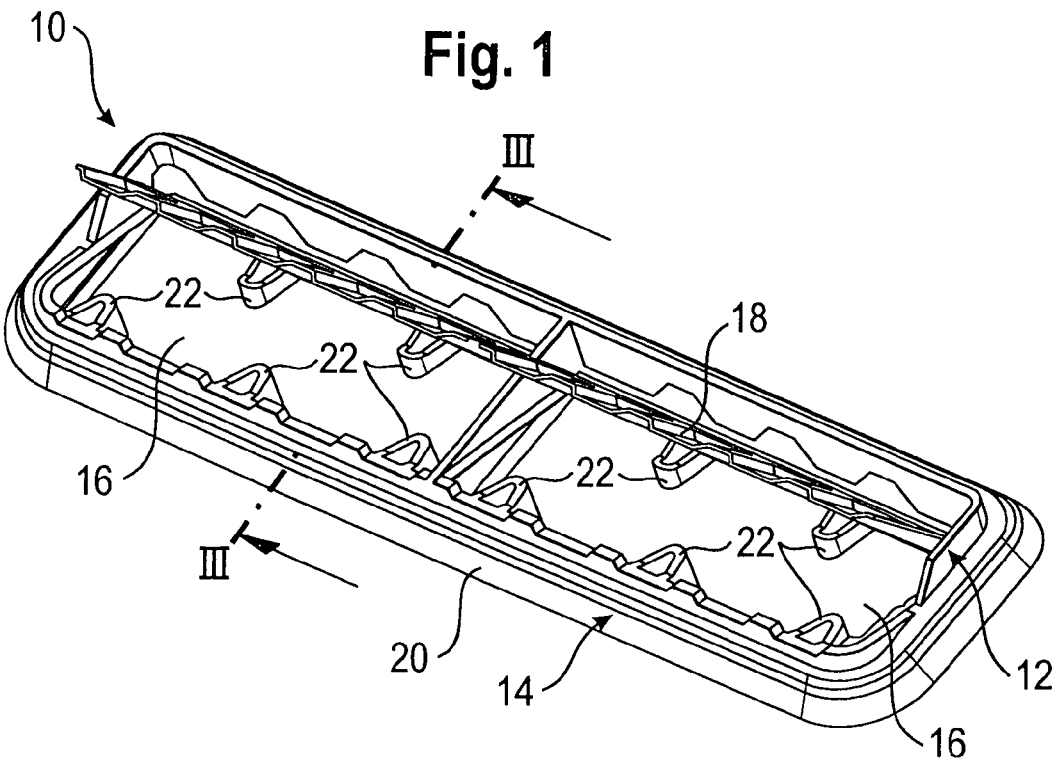
FIG. 1 shows a perspective view of a ventilation device of the invention with a frame and a non-return flap element, wherein a non-return flap is in an open position.
Figure 2:
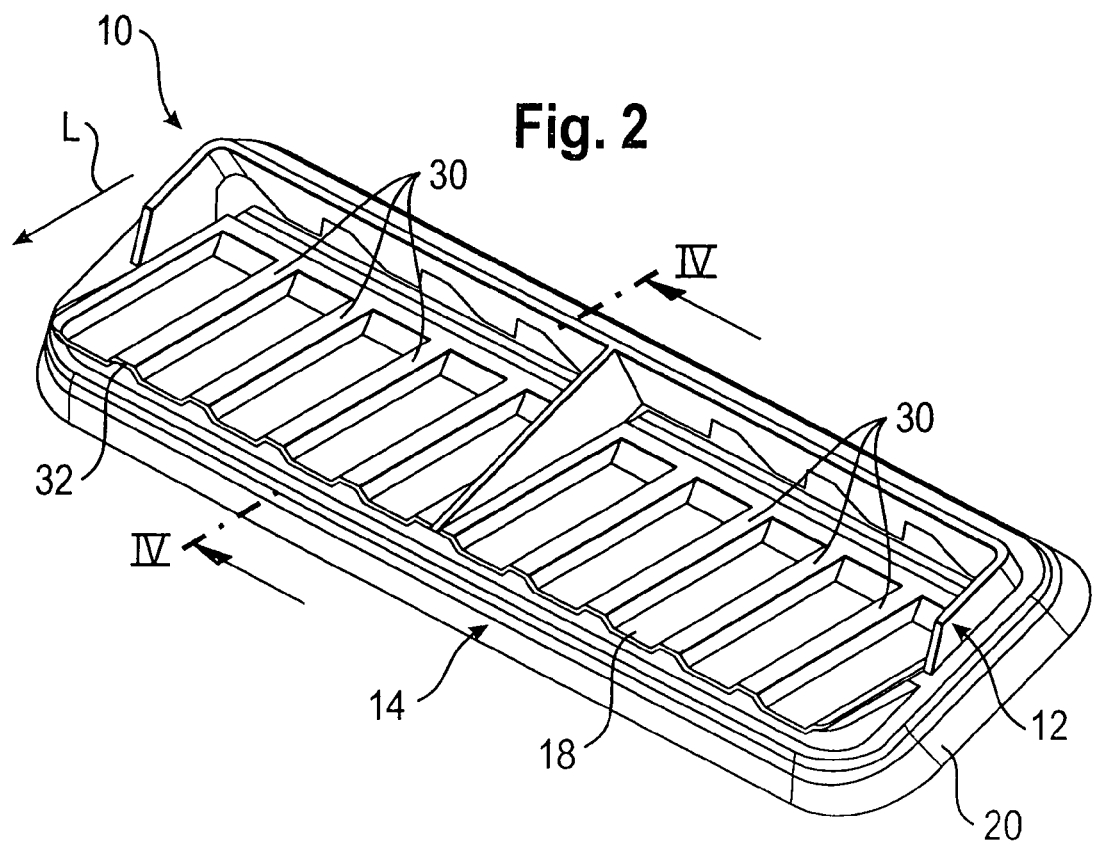
FIG. 2 shows a perspective view of the ventilation device of FIG. 1, wherein the non-return flap is in a closed position.
Figure 3:
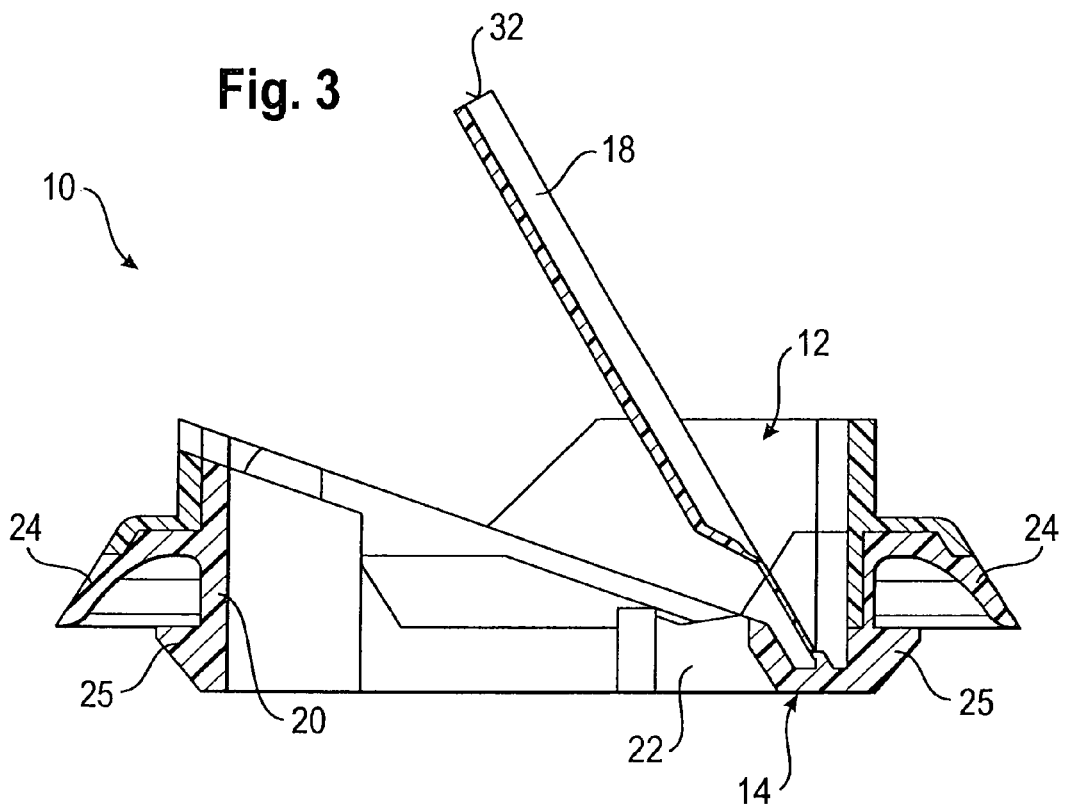
FIG. 3 shows a sectional view of the ventilation device along line III-III of FIG. 1.

FIGS. 1 to 8 show a ventilation device 10 in accordance with a first embodiment. The ventilation device 10 consists of a frame 12 (see in particular FIGS. 7 and 8) made of a first material component and a non-return flap element 14 (see in particular FIGS. 5 and 6) made of a second material component. The first material component, of which the frame 12 is made, is harder than the second material component, of which the non-return flap element 14 is formed. The frame 12 thus serves to reinforce the ventilation device 10.

The frame 12 is formed like a grid and includes two outflow openings 16. The outflow openings 16 can be covered or closed by a non-return flap 18, which is part of the non-return flap element 14.

The non-return flap element 14 consists of a grid-like frame member 20 and of the non-return flap 18. The grid-like frame member 20 has two outflow openings, which correspond to the outflow openings 16 of the frame 12 and in the assembled condition are aligned with the same.

Over the width B of the frame member 20, protrusions 22 are distributed, which are triangular as seen in cross-section and each protrude with their tip first into the outflow openings 16. The protrusions 22 do not constitute "full profile", so that they provide less resistance to the outflowing air. There are provided four protrusions at the top (with respect to FIG. 5) and six protrusions at the bottom (with respect to FIG. 6), against which the non-return flap 18 rests in its closed position. In particular, in its closed position the non-return flap 18 exclusively rests against the softer material component.

Figure 6:
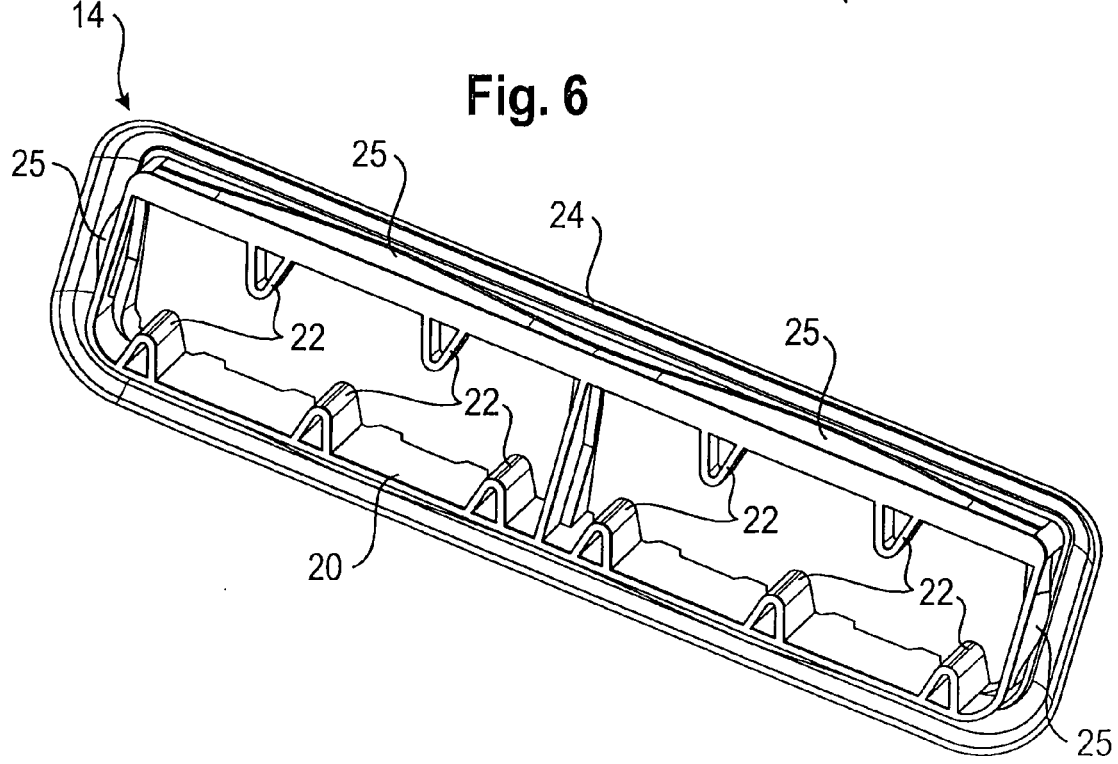
FIG. 6 shows a perspective view of that side of the non-return flap element of FIG. 5 which is opposite to the non-return flap.
Figure 7:
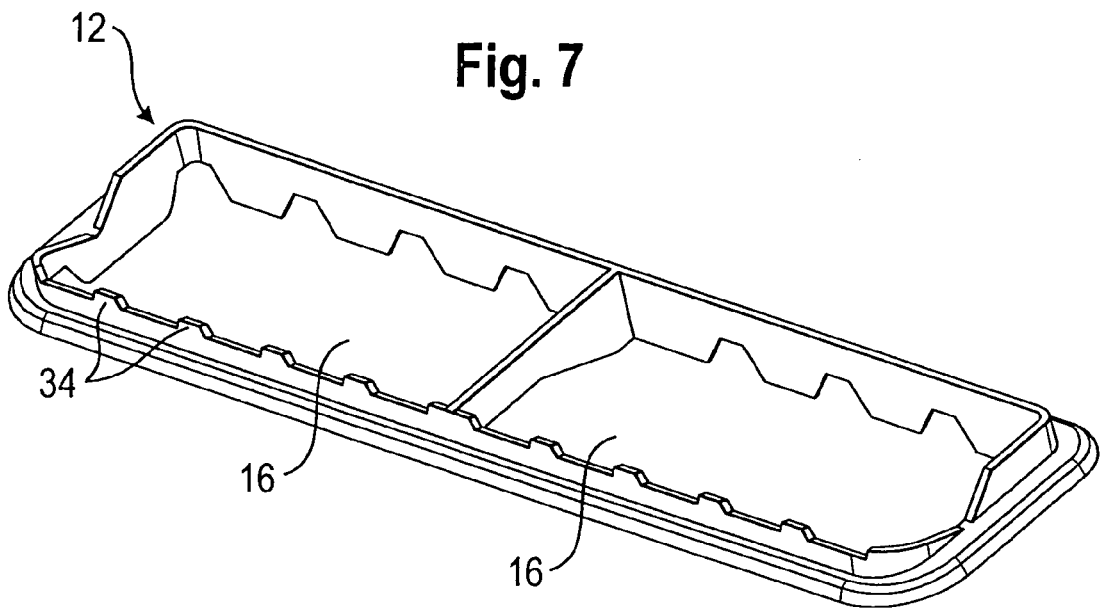
FIG. 7 shows a perspective view of the frame which is part of the ventilation device of FIGS. 1 to 6.
Figure 8:
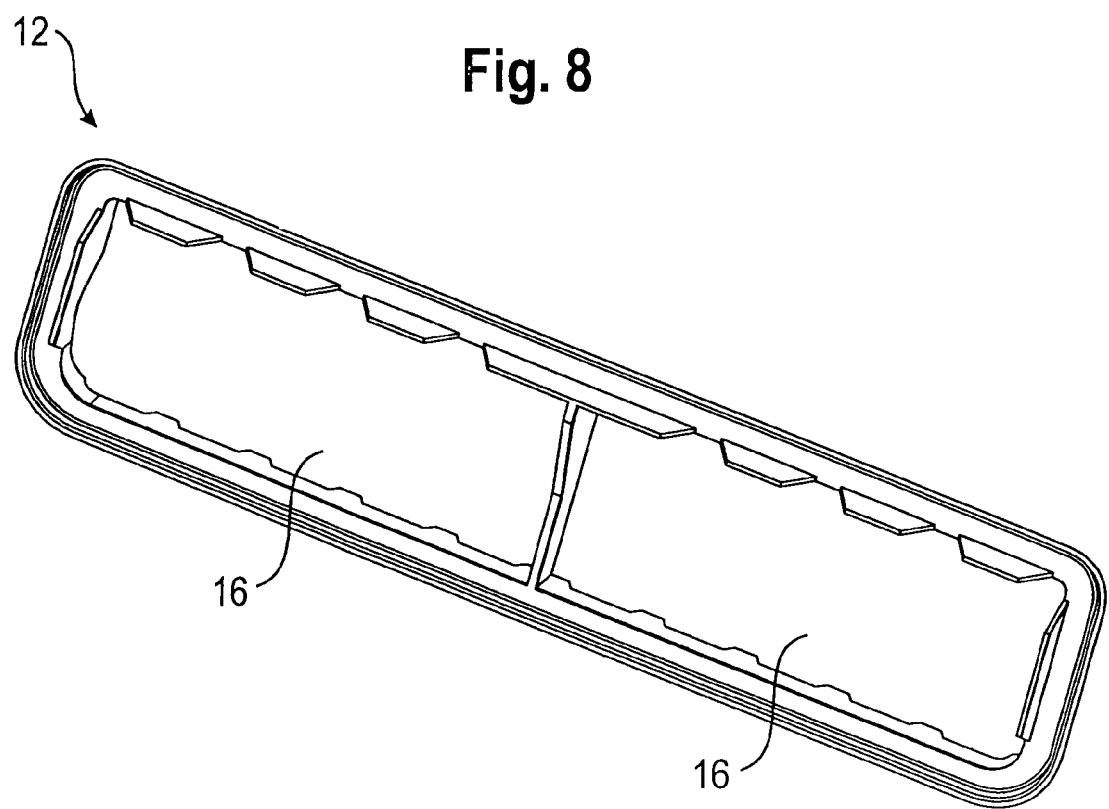
FIG. 8 shows a perspective view of that side of the frame of FIG. 7 which in the mounted condition faces a vehicle component.
Figure 9:
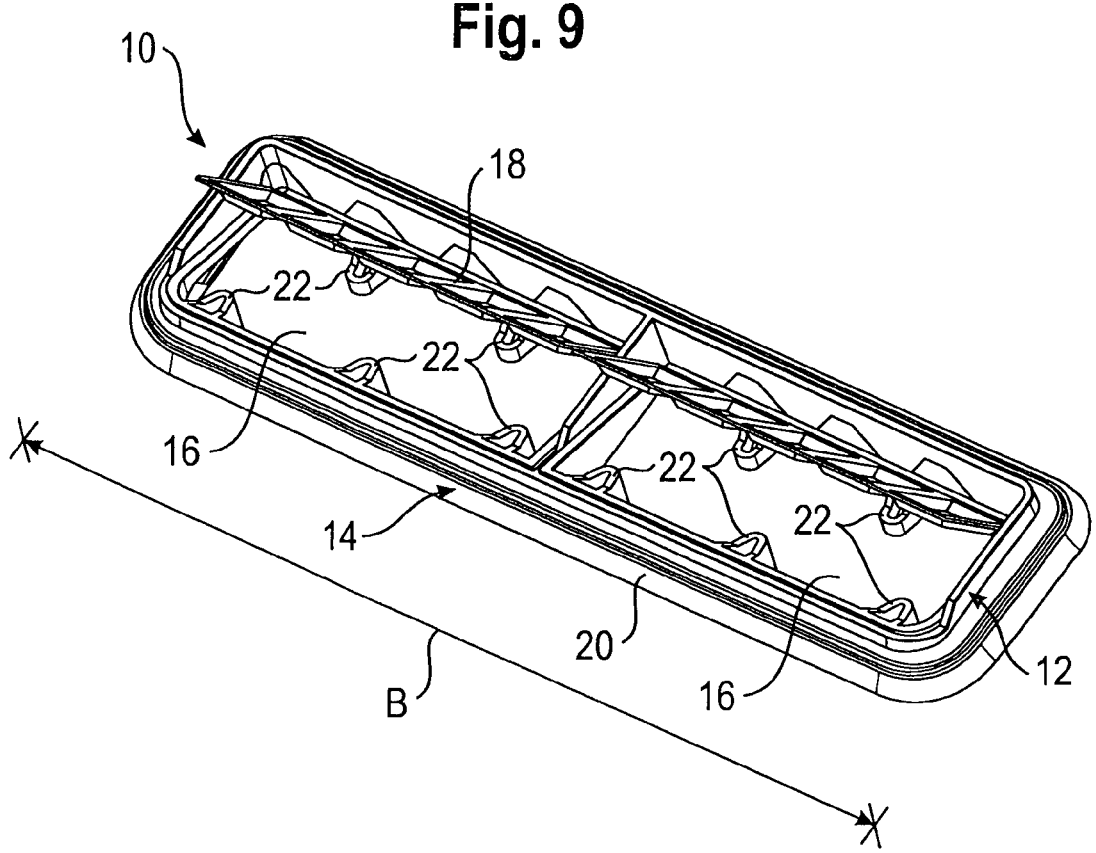
FIG. 9 shows a perspective view of a ventilation device of the invention in accordance with a second embodiment with the frame and the non-return flap element, wherein the non-return flap is in an open position.
Figure 10:
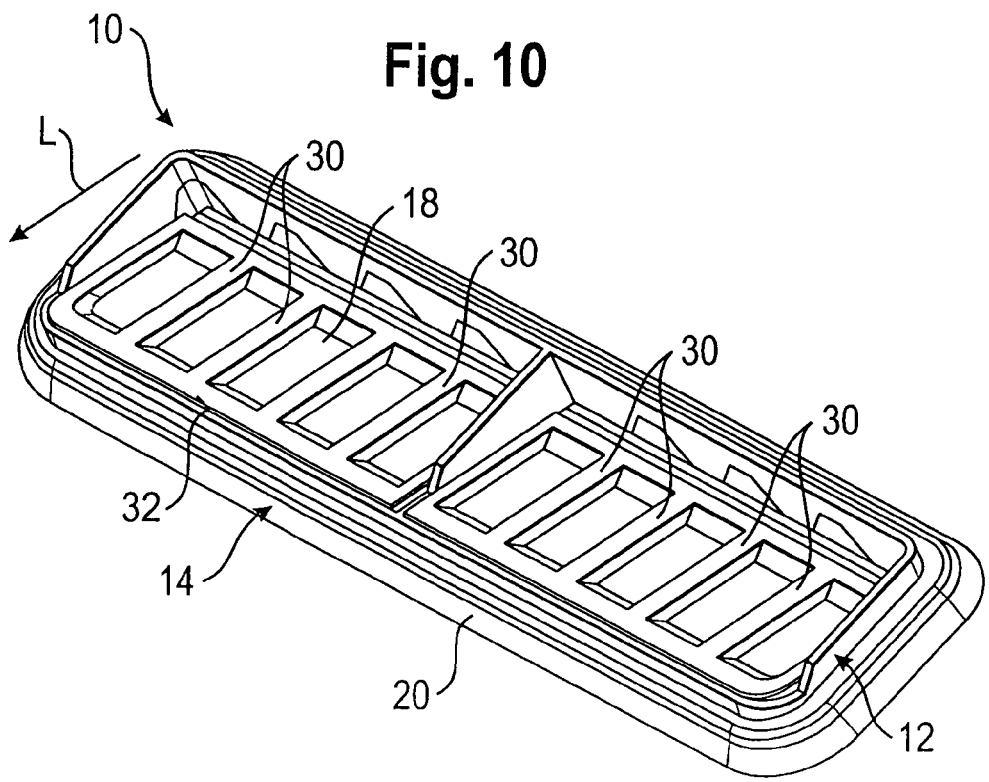
FIG. 10 shows a perspective view of the ventilation device of FIG. 9 with the non-return flap in the closed position.
Figure 11:
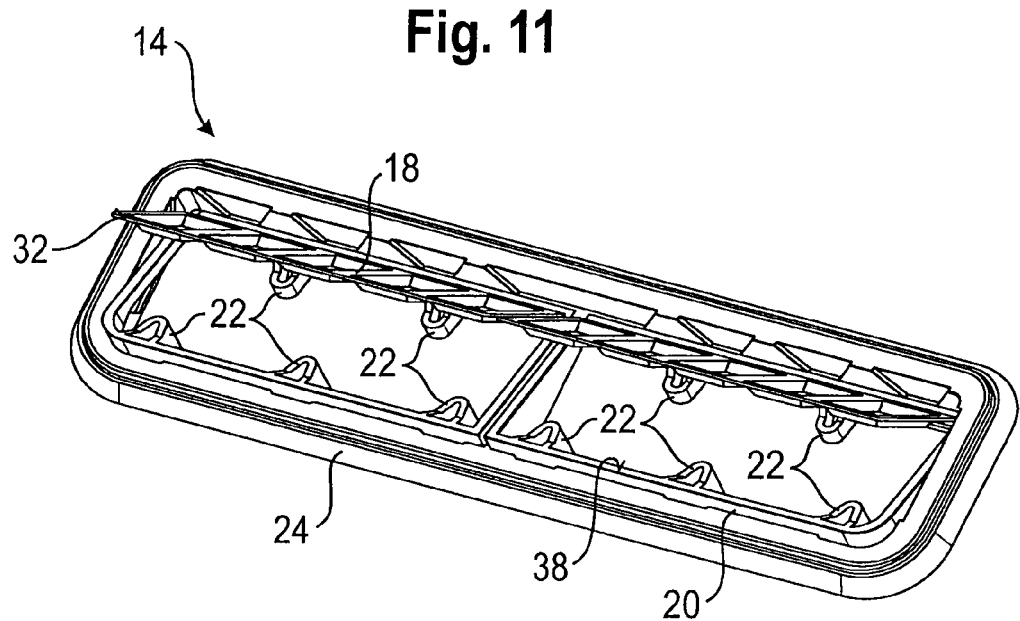
FIG. 11 shows a perspective view of the non-return flap element, which is part of the ventilation device of FIGS. 9 and 10, with the non-return flap in the open position.
Figure 12:
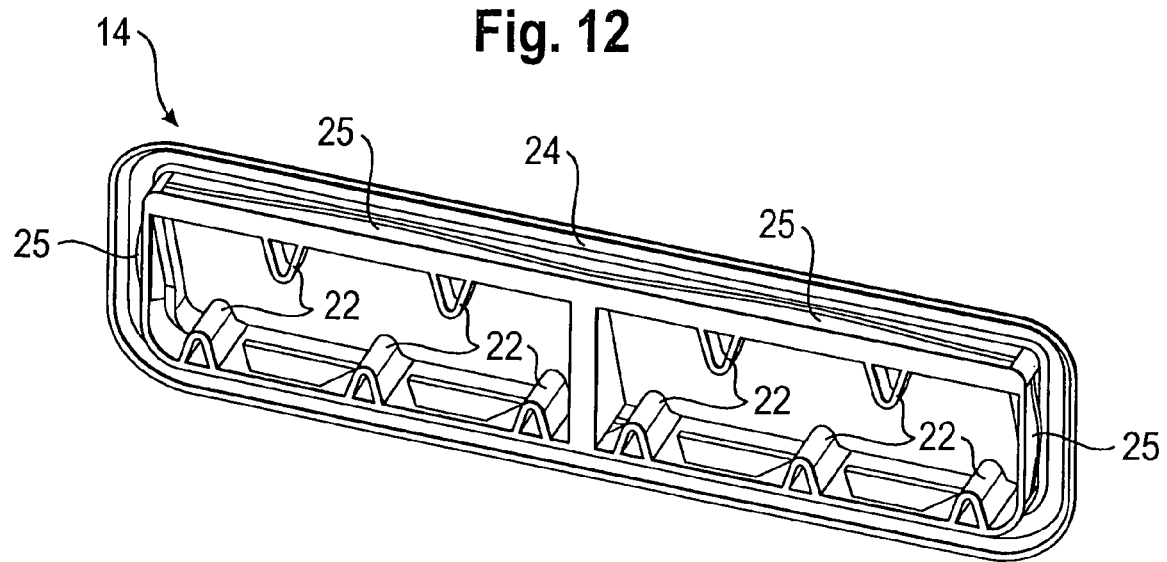
FIG. 12 shows a perspective view of that side of the non-return flap element of FIG. 11 which is opposite to the non-return flap.
Figure 13:
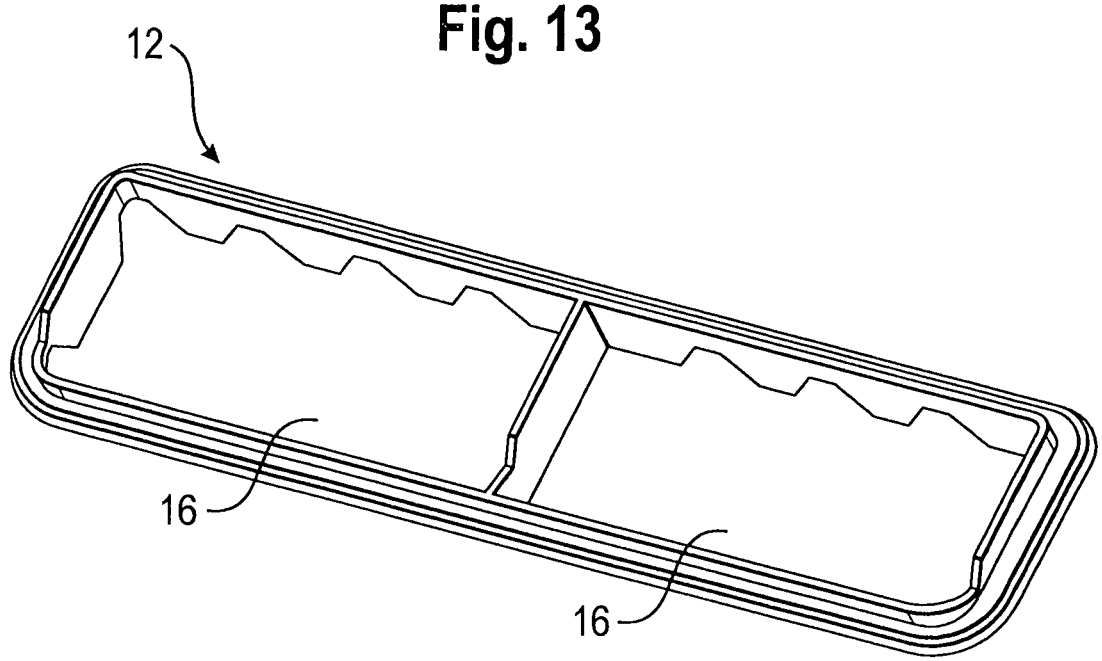
FIG. 13 shows a perspective view of the frame which is part of the ventilation device of FIGS. 9 to 12.
Figure 14:
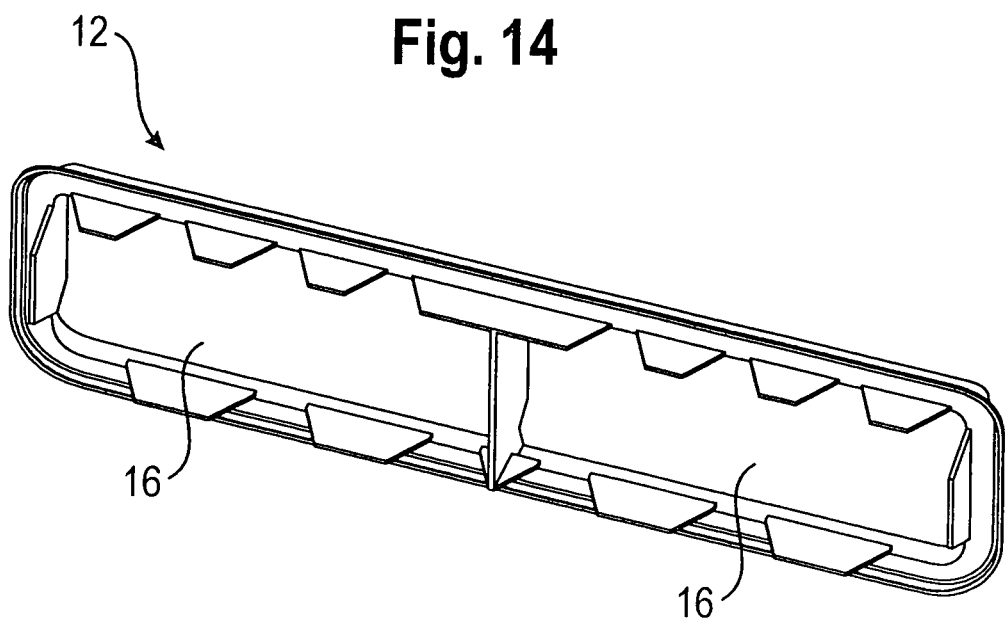
FIG. 14 shows a perspective view of that side of the frame which in the mounted condition faces a vehicle component.

The non-return flap element 14 includes a closed circumferential lip 24 and a plurality of curved lips 25 distributed around the periphery, which are partly elliptical as seen in a top view and are provided on the bottom surface of the non-return flap element 14 (with respect to FIG. 6). FIG. 6 shows four curved lips 25, wherein two are shown on the short side and two on the long side of the non-return flap element 14. On the second long side of the non-return flap element 14, which is not visible due to the perspective view, there should also be provided two curved lips 25.

Figure 4:
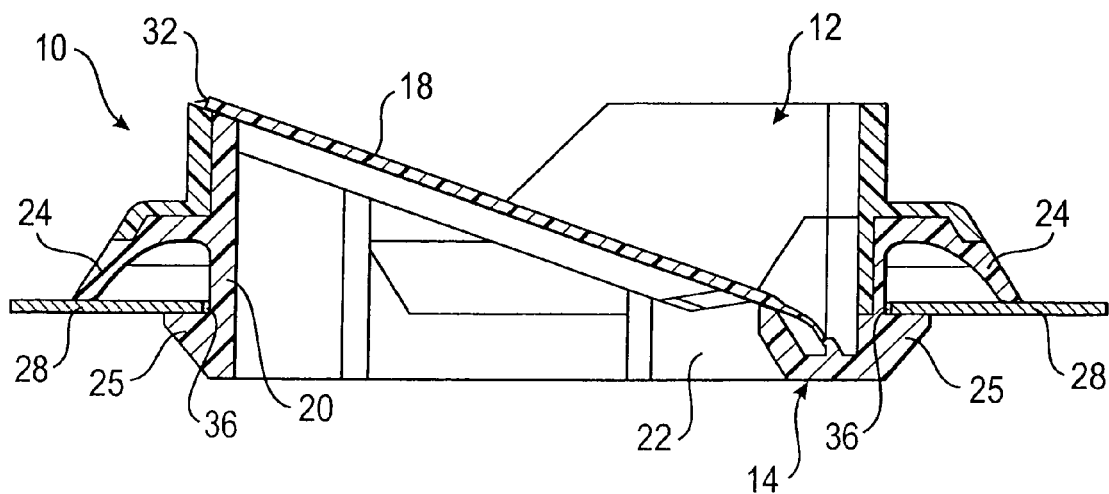
FIG. 4 shows a sectional view of the ventilation device along line IV-IV of FIG. 2 with a vehicle component.
Figure 5:
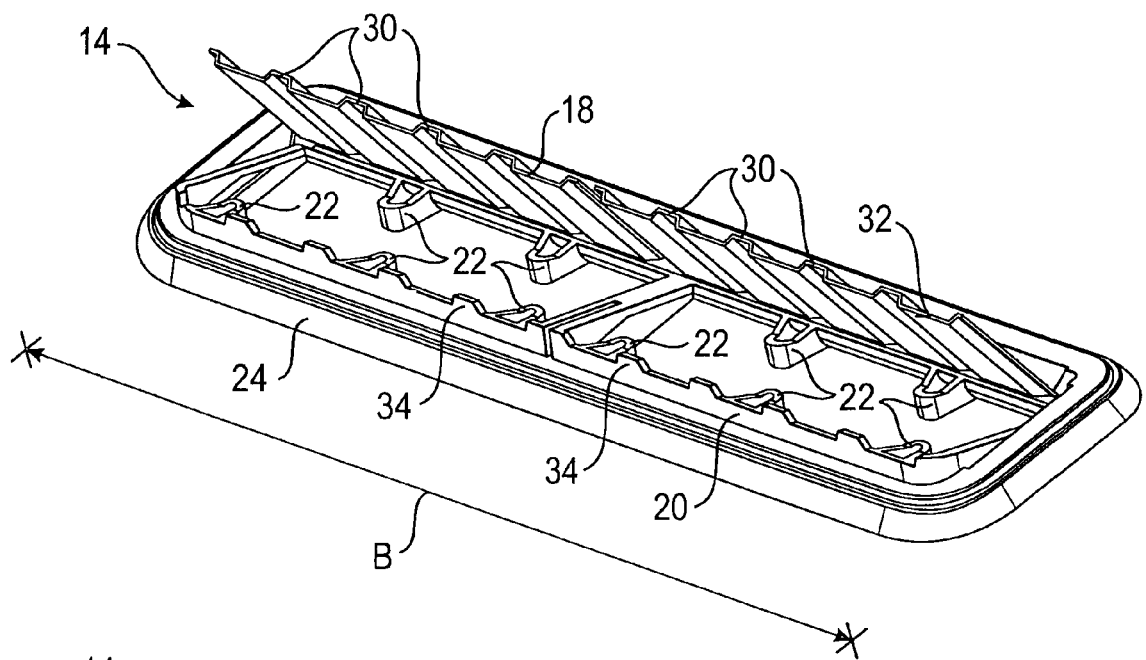
FIG. 5 shows a perspective view of the non-return flap element, which is part of the ventilation device of FIGS. 1 to 4, with the non-return flap in the open position.

Between the circumferential lip 24 and the curved lips 25, a vehicle component 28 can be accommodated and clamped. In FIG. 4, the vehicle component 28 is clamped between the lips 24, 25. The vehicle component 28 is held by the circumferential lip 24 and the curved lips 25. Thus, only parts of the non-return flap element 14 engage the vehicle component 28 and not parts of the frame 12.

Upon insertion of the ventilation device 10 into the vehicle component 28, the lip 24 seals between the ventilation device 10 and the vehicle component 28.

The non-return flap 18, which is part of the non-return flap element 14 and consists of the second, softer material component, includes reinforcement ribs 30, which are provided in longitudinal direction L of the non-return flap 18 and are parallel to each other. The reinforcement ribs 30 extend up to an edge 32 of the non-return flap 18. To enable the non-return flap 18 to rest against the frame member 20 without any gap, the frame member 20 has a contour with depressions and elevations corresponding to the reinforcement ribs 30, which is provided with the reference numeral 34.

The manufacture of the ventilation device 10 is effected as follows: The frame 12, which is used for reinforcement, is made of a first material component. Subsequently, the frame 12 is connected with the non-return flap element 14, which is made of a material component softer than the frame 12. In particular, the frame 12 and the non-return flap element 14 can be manufactured by a two-component injection molding method.

The two parts (frame 12 and non-return flap element 14) are connected such that the non-return flap 18, which is part of the non-return flap element 14, exclusively rests against the non-return flap element 14. This means that the non-return flap 18 does not rest against the frame 12, but against a part of the non-return flap element 14 which is made of the same material as the non-return flap 18 itself. Disturbing noise during closure of the non-return flap 18 thereby is avoided.

The ventilation device 10 is inserted in an opening 36 of a vehicle component 28 and attached thereto. In particular, the vehicle component 28 is positioned such that the lip 24 engages the vehicle component 28 from above (with respect to FIG. 4) and the curved lips 25 engage the vehicle component 28 from below (with respect to FIG. 4) and clamp the same. In the mounted condition, the curved lips 25 face a passenger compartment.

Thus, the vehicle component 28 only engages the non-return flap element 14, which is made of a material component which is softer than the material component of the frame 12. The ventilation device 10 therefore is decoupled from the vehicle component 28, so that no vibrations resulting from the opening and closing of the non-return flap 18 are transmitted to the vehicle component 28.

Upon insertion of the ventilation device 10 into the vehicle component 28, the lip 24 seals between the ventilation device 10 and the vehicle component 28.

In FIGS. 9 to 14, a second embodiment is shown.

The same only differs from the embodiment shown in FIGS. 1 to 8 in that the reinforcement ribs 30, which are formed on the non-return flap 18, do not extend up to the edge 32. The reinforcement ribs 30 end at a distance from the edge 32. The surface of the non-return flap element 14, against which the non-return flap 18 rests in the closed condition and which is provided with the reference numeral 38, therefore is formed flat (i.e. without elevations or depressions).

The invention claimed is:

1. A ventilation device for mounting in an opening (36) of a vehicle component (28), comprising
a frame (12) made of a first material component, and
a non-return flap structure (14) made of a second material component,
wherein the first material component is harder than the second material component, wherein the non-return flap structure (14) includes a movable non-return flap (18), which is arranged such that it exclusively rests against the non-return flap structure (14), the non-return flap structure (14) being made of one piece, and wherein the non-return flap structure (14) includes protrusions, which can be engaged by the non-return flap (18).

2. The ventilation device according to claim 1, wherein the protrusions (22) are distributed over the width (B) of the non-return flap structure (14).

3. The ventilation device according to claim 1, wherein the protrusions (22) are triangular as seen in cross-section.

4. The ventilation device according to claim 1, wherein the non-return flap structure (14) includes at least one lip (24, 25), which serves to mount the non-return flap structure (14) on the vehicle component (28).

5. The ventilation device according to claim 4, wherein the lip (24) serves as sealing lip.

6. The ventilation device according to claim 1, wherein the non-return flap (18) includes reinforcement ribs (30), the reinforcement ribs (30) extending in a longitudinal direction (L) up to at least one edge (32) of the non-return flap (18).

7. The ventilation device according to claim 1, wherein the non-return flap (18) includes reinforcement ribs (30), the reinforcement ribs (30) not extending in a longitudinal direction (L) UP to at least one edge (32) of the non-return flap (18).

8. The ventilation device according to claim 1, wherein the ventilation device (10) is mountable in the opening (36) of the vehicle component (28), and wherein that part of the ventilation device (10) which engages the vehicle component (28) is a part of the non-return flap structure (14).

9. The ventilation device according to claim 1, wherein the movable non-return flap (18) rests exclusively against the non-return flap structure (14) when the movable non-return flap (18) is in a closed position.

10. The ventilation device according to claim 1, wherein the frame (12) is indirectly coupled by the non-return flap structure (14) to the vehicle component (28), when the ventilation device (10) is mounted on the vehicle component (28).

11. The ventilation device according to claim 1, wherein the movable non-return flap (18) is made of the second material component.

12. A ventilation device for mounting in an opening (36) of a vehicle component (28), comprising
   a frame (12) made of a first material component, and
   a non-return flap structure (14) made of a second material component,
   wherein the first material component is harder than the second material component,
   wherein the ventilation device (10) is mountable on the vehicle component (28) such that a part of the ventilation device (10) which engages the vehicle component (28) is a part of the non-return flap structure (14), and
   wherein the non-return flap structure (14) includes a movable non-return flap (18) arranged to exclusively rest against the non-return flap structure (14) when the non-return flap (18) is in a closed position.

* * * * *